US011435950B2

United States Patent
Shiozaki et al.

(10) Patent No.: US 11,435,950 B2
(45) Date of Patent: Sep. 6, 2022

(54) DATA REWRITING METHOD AND DATA REWRITING SYSTEM

(71) Applicant: YAZAKI CORPORATION, Tokyo (JP)

(72) Inventors: Tomohiro Shiozaki, Shizuoka (JP); Yoshihide Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/864,686

(22) Filed: May 1, 2020

(65) Prior Publication Data

US 2020/0371717 A1 Nov. 26, 2020

(30) Foreign Application Priority Data

May 23, 2019 (JP) .............................. JP2019-096595

(51) Int. Cl.
*G06F 3/06* (2006.01)
*G06F 13/40* (2006.01)
*B60W 50/06* (2006.01)
*G05B 15/02* (2006.01)

(52) U.S. Cl.
CPC .......... *G06F 3/0659* (2013.01); *B60W 50/06* (2013.01); *G06F 3/0604* (2013.01); *G06F 3/0673* (2013.01); *G06F 13/4027* (2013.01); *G05B 15/02* (2013.01)

(58) Field of Classification Search
CPC .... G06F 3/0613; G06F 3/0619; G06F 3/0659; G06F 3/068; G06F 12/0811; G06F 12/0833; G06F 12/1027; G06F 2212/283; G06F 2212/62; G06F 2212/683
See application file for complete search history.

(56) References Cited

U.S. PATENT DOCUMENTS

| 6,463,373 B2 * | 10/2002 | Suganuma .......... B60R 16/0232 |
| | | 303/112 |
| 2016/0313715 A1 * | 10/2016 | Fischer .................... G06F 8/654 |
| 2018/0018160 A1 | 1/2018 | Teraoka et al. |
| 2018/0300059 A1 | 10/2018 | Nakamura et al. |
| 2018/0336025 A1 * | 11/2018 | Taniguchi ............... G06F 11/00 |

FOREIGN PATENT DOCUMENTS

| JP | 2000-043654 A | 2/2000 |
| JP | 2003-191804 A | 7/2003 |
| JP | 2012-242900 A | 12/2012 |
| JP | 2016-170740 A | 9/2016 |
| JP | 2017-146773 A | 8/2017 |
| JP | 2018-200599 A | 12/2018 |

* cited by examiner

*Primary Examiner* — Gary W. Cygiel
(74) *Attorney, Agent, or Firm* — Sughrue Mion, PLLC

(57) ABSTRACT

A rewriting process of data stored in a control device is performed while executing a normal process. In a control system including a plurality of control devices in which data have been stored, each of which is a device for controlling an electric component of an automobile, a first communication line interconnecting the plurality of control devices, and a second communication line interconnecting the plurality of control devices for hacking up the first communication line, a rewriting device in which rewriting data have been stored is connected to the second communication line, and the rewriting device rewrites data stored in the control device to be rewritten with the rewriting data based on the rewriting data using the second communication line.

5 Claims, 2 Drawing Sheets

DATA REWRITING METHOD AND DATA REWRITING SYSTEM

BACKGROUND OF THE INVENTION

Field of the Invention

The present invention relates to rewriting of data stored in a control device for controlling an electric component of an automobile.

Background Art

An automobile is equipped with multiple control units (ECUs) for controlling electrical components. These control devices are connected by a communication line and communicate with each other, thus controlling electronic components. These control devices will improve or add functionality after sale of the automobile, and in such cases, data such as control programs for these control devices need to be rewritten.

Connecting a rewriting device in which rewriting data have been stored to the communication line to which these control devices are connected by wire or wirelessly allows the data stored in these controllers to be rewritten based on the rewrite data (Patent Literatures 1 and 2).

CITATION LIST

Patent Literature

Patent Literature 1: JP-A-2000-43654
Patent Literature 2: JP-A-2018-200599

SUMMARY OF THE INVENTION

However, conventionally, communication for rewriting data stored in a control device has been performed by a communication line used for performing normal processing such as controlling electrical components. Therefore, when performing data rewriting processing, a communication line could not be not used for normal processing, and thus could not perform normal processing. Also, for this reason, conventionally, the rewriting process of the data stored in the control device is performed during parking where the automobile is unused regardless of whether or not the rewriting process has any effect on driving.

The present invention has been made in view of the above background, aiming at performing normal process while rewriting data stored in the control device.

A data rewriting method according to one embodiment of the present invention is the one of rewriting data stored in a control device of a system including a plurality of control devices having stored data, each of which is a device for controlling an electric component of an automobile, a first communication line interconnecting the plurality of control devices; and a second communication line interconnecting the plurality of control devices for backing up the first communication line, the data rewriting method comprising the step of a connection step of connecting the second communication line via a rewriting device having stored a rewriting data; a rewriting step of rewriting data stored in the control devices to be rewritten with the rewriting data based on the rewriting data using the second communication line. Preferably, the rewriting device, prior to the rewriting step, determines whether data can be rewritten while the automobile is running based on an attribute of the control device to be rewritten, and further determines whether the automobile is running if data cannot be rewritten, the rewriting step is not performed if the automobile is running.

In addition, the data rewriting method according to another embodiment of the present invention of rewriting data stored in a slave device of a control system including a plurality of control devices having stored data, each of which is a device for controlling an electric component of an automobile, and stores data, a first communication line interconnecting the plurality of control devices; a second communication line interconnecting the plurality of control devices for backing up the first communication line, a third communication line, and a plurality of slave devices having stored data, connected to any of the control devices via the third communication line, communication of which is controlled by the control devices, the data rewriting method comprising the step of a connection step of connecting the second communication line via a rewriting device having stored a rewriting data; and a rewriting step of rewriting data stored in the slave devices to be rewritten with the rewriting data by the second and third communication lines.

A data rewriting system according to another embodiment of the present invention includes: a plurality of control devices having stored data, each of which is a device for controlling an electric component of an automobile, and stores data; a first communication line interconnecting the plurality of control devices and used for communication for controlling the electric component of the automobile; a second communication line interconnecting the plurality of control devices for backing up the first communication line; a rewriting device having stored a rewriting data, wherein the rewriting device is configured to connect the second communication line by wire or wirelessly, and rewrite data stored in the control device to be rewritten with the writing data based on the rewriting data using the second communication line.

According to the aspect described above, while performing normal processing, rewriting of the data stored in the control device can be performed.

DETAILED DESCRIPTION OF THE PREFERRED EMBODIMENTS

Figure 1:
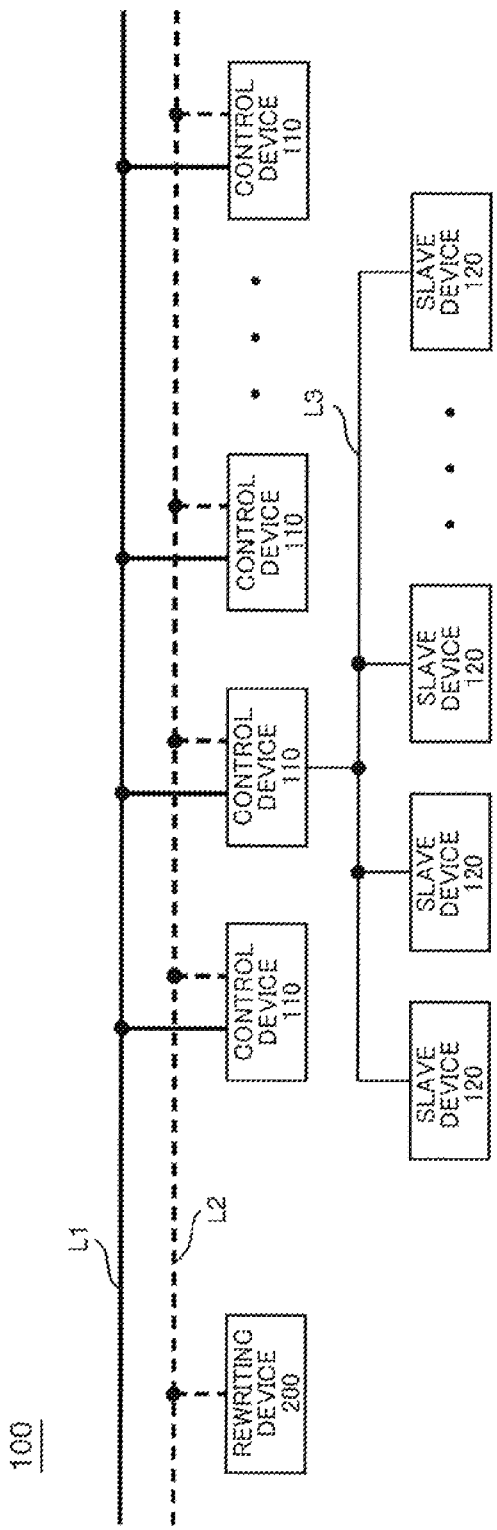
FIG. 1 is a diagram showing a control system 100 according to one embodiment of the present invention.

<Control System 100>
FIG. 1 is a diagram showing a control system 100 according to an embodiment of the present invention. The control system 100 includes a plurality of control devices 110, a first communication line L1, and a second communication line L2.

Each of the plurality of control devices 110 is a device for controlling an electric component of an automobile, and stores data such as control program. Each of the plurality of control devices 110 is connected to the first communication line L1 and the second communication line L2, communicating with other control devices 110 using the first communication line L1 and the second communication line L2.

Each of the plurality of control devices 110 performs communication necessary for normal processing such as control of electric component of the automobile using the first communication line L1. The first communication line L1 is a communication line for protocol, for example, CAN (Controller Area Network), MOST (Media Oriented System Transport), or FlexRay.

The second communication line L2 is communication line for backup of the first communication line L1. That is, the second communication line L2 is not used for communication for normal processing if communication can be done normally with the first communication line L1, and is used for communication for normal processing if an abnormality has occurred in the first communication line L1. The second communication line L2 may be a communication line for the same protocol as the first communication line L1, or for a different protocol.

In this embodiment, a rewriting device 200 in which the rewriting data have been stored is connected to the second communication line L2. Then, the rewriting device 200 and the control device 110 to be rewritten with the rewriting data communicate using the second communication line L2, and through communication between the rewriting device 200 and the control device 110 using the second communication line L2, the data stored in the control device 110 is rewritten based on the rewriting data.

For this reason, in the present embodiment, even though while the data stored in the control device 110 is being rewritten, communication for normal processing can be performed between the control devices 110 other than the control device 110 during rewriting using the first communication line L1. Therefore, in the present embodiment, the control devices 110 other than the control device 110 during rewriting can perform the normal processing. Therefore, in the present embodiment, while performing the normal processing, the data stored in the control device 110 can be rewritten.

The connection between the rewriting device 200 and the second communication line L2 may be wired or wireless. When the connection between the rewriting device 200 and the second communication line L2 is wired, for example, a connection unit that connects the rewriting device 200 may be connected to the second communication line L2. When the connection between the rewriting device 200 and the second communication line L2 is wireless, for example, a receiving unit that receives a signal from the rewriting device 200 may be connected to the second communication line L2.

Some of the electrical components of the automobile, such as air conditioners or audio do not affect running of the automobile. These do not affect running of the automobile even if no longer used while driving. For this reason, rewriting the data stored in the control device 110 that controls these electrical components during running, even if these electrical components can no longer be used, causes no problem in running the automobile.

Therefore, the rewriting device 200, when connected to the second communication line L2, may confirm whether or not the control device 110 to be rewritten is the control device 110 that controls electrical components that do not affect the driving of the automobile. Then, the rewriting device 200, when the control device 110 to be rewritten is a control device that controls electrical components that do not affect the running of the automobile, may rewrite the control device 110 to be rewritten even if the automobile is running.

In addition, the rewriting device 200, if the control device 110 to be rewritten is not a control device that does not affect the running of the automobile, may check if the automobile is running. Then, when the automobile is not running, the rewriting device 200 performs a process of rewriting data stored in the control device 110 to be rewritten, but when the automobile is running, the data stored in the controller 110 to be rewritten may not be rewritten. That is, if the device 110 is not a control device that controls electrical components that do not affect the running of the automobile, the rewriting device 200 may rewrite the data stored in the controller 110 to be rewritten only when the automobile is not running. At this time, the rewriting device 200 acquires the measured value of the speed of the automobile from the control device of the speed sensor connected to the second communication line L2, confirms whether or not the automobile is running based on this measured value.

Thus, the control unit 110 to be rewritten that controls electrical components that do not affect the driving of the automobile can rewrite the data stored in the control device 110 even while the automobile is running, shortening the time required for rewriting during parking, and preventing a decrease in the battery charge during parking.

Before starting the rewriting process, the rewriting device 200 may confirm with the user whether or not to start the rewriting process. The rewriting device 220 communicates with the control device of a user interface connected to, for example, the second communication line L2, confirming with the user whether to start the rewriting process.

This prevents writing process from being performed at unintended timing by the user. In this way, for example, it is possible to prevent sudden stoppage of the electrical components the user is using due to rewriting processing.

<Master/Slave>

The control system 100, as shown in FIG. 1, is configured to include a third communication line L3 and slave devices 120 connected to the control device 110 via third communication line L3, and the slave device 120 and the control device 110 connected by the communication line L3 may form a subnetwork. The third communication line L3 is, for example, a communication line for protocols such as LIN (Local Interconnect Network).

Each of the plurality of slave control devices 120 is, for example, connected to electrical components such as a power window actuator or a window position sensor and controls the connected electrical components. The control device 110 controls communication with the slave device 120 connected by the third communication line L3. That is, for example, if the third communication line L3 is a communication line for LIN, the slave device 120 functions as a slave node, and the control device 110 functions as a master node of the slave device 120 connected by the third communication connection L3.

When the rewriting object of the rewriting data is the slave device 120, the rewriting device 200 communicates using the second communication line L2 with the control device connected by the third communication line L3 to the slave device 120 whose data is to be rewritten, and the control device 110 communicates by the third communication line L3 with the slave device 120 to be rewritten with the rewriting data. In the present embodiment, communication using the second communication line L2 between the rewriting device 200 and the control device 110, and using the third communication line L3 between the control device 110 and the plurality of slave devices 120 allows the data stored in the plurality of slave devices 120 to be rewritten based on the rewriting data.

Therefore, during the rewriting process of the data stored in the slave device 120, normal processing cannot be performed in the control device 110 and the slave device 120 in the subnetwork to which the slave device 120 belongs, but devices outside this subnetwork can communicate for normal processing using the first communication line L1, the devices outside the subnetwork can perform normal processing. Therefore, in this embodiment, it is possible to rewrite data stored in the slave device 120 during normal processing.

<Data Rewriting Method>

Figure 2:
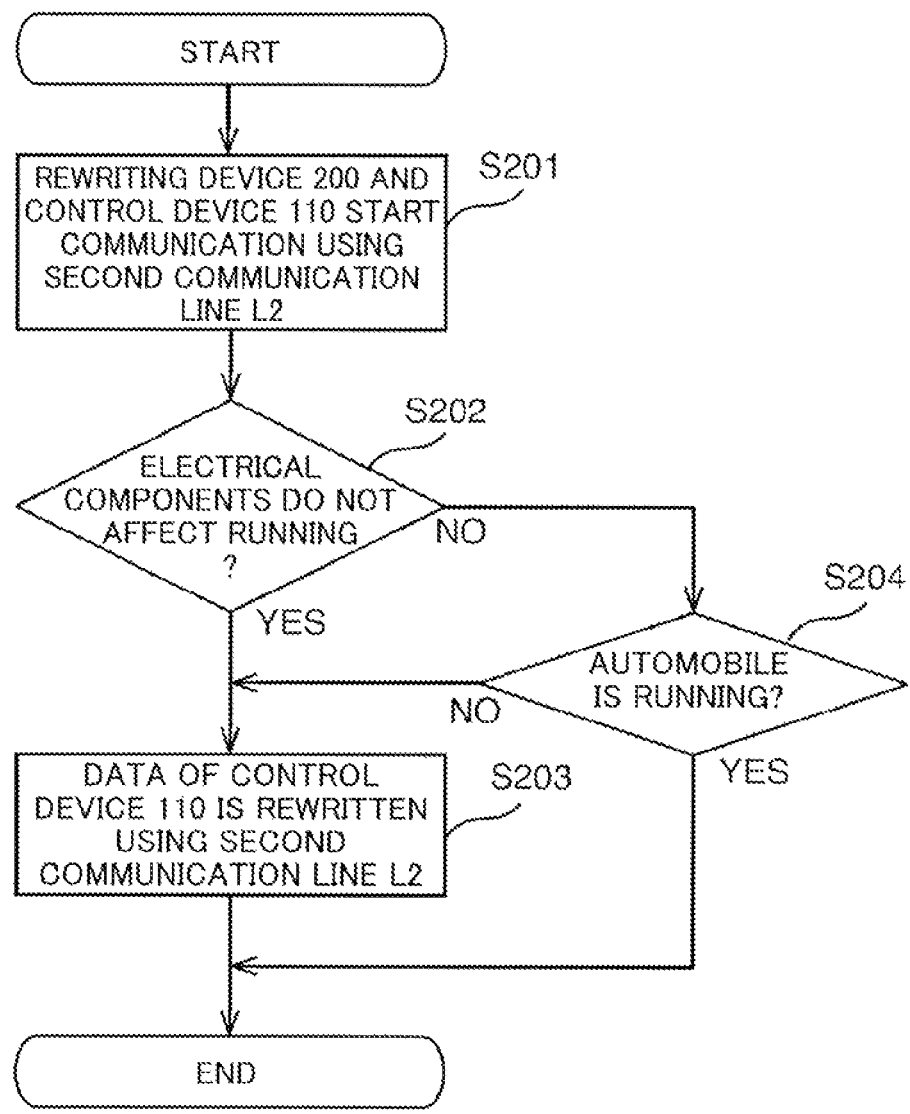
FIG. 2 is a flowchart showing a method of rewriting data stored in a control device 110 according to another embodiment of the present invention.

FIG. 2 is a flowchart showing a method of rewriting data stored in control device 110 of the present embodiment. The rewriting device 200 is assumed to specify the control device 110 to be rewritten in advance. The rewriting device 200 is connected to the second communication line L2 by wire or wirelessly, and the rewriting device 200 and the control device 110 start communication using the second communication line L2 (step S201). The rewriting device 200 confirms whether or not the control device 110 to be rewritten with the rewriting data is a control device 110 that controls electrical components that do not affect running of the automobile (Step S202). If the control device 110 to be rewritten with the rewriting data is a control device 110 that controls the electrical components that do not affect running of the automobile (YES in step S202), the process of rewriting the data stored in the control device 110 is performed by communication between the rewriting device 200 and the control device 110 using the second communication line L2 (S203).

If the control device to be rewritten with rewriting data is not a control device that controls electrical components that do not affect the driving of the automobile (NO in step S202), the rewriting device 200 checks whether the automobile is running (S204). If the automobile is running (YES in step S204), the rewriting device 200 ends the processing. In this case, for example, this process is re-executed after a predetermined interval. If the automobile is not running (NO in step S204), the process of writing the data stored in the control device 110 is performed by communication between the rewriting device 200 and the control device 110 using the second communication line L2 (S203).

The present invention has been described with reference to the preferred embodiments of the present invention. The present invention has been described here by showing some specific examples, however, various modifications and changes can be made in these examples without departure from the spirit and scope of the present invention as set forth in the appended claims.

REFERENCE SIGNS LIST 100 control system
110 control device
120 slave device
200 rewriting device
L1 first communication line
L2 second communication line
L3 third communication line

What is claimed is:

1. A data rewriting method of rewriting data stored in a control device of a control system while performing normal processing, the control system including a plurality of control devices in which data have been stored, each of which is a device for controlling an electric component of an automobile, a first communication line interconnecting the plurality of control devices, and a second communication line interconnecting the plurality of control devices for backing up the first communication line, wherein the first communication line is used for communication necessary for normal processing such as control of the electric component of the automobile, the second communication line is used for communication for data rewriting, and for normal processing when an abnormality occurs in the first communication line, the method comprising the steps of:

a connection step of connecting a rewriting device in which rewriting data have been stored to the second communication line;

a rewriting step via the rewriting device of rewriting data stored in the control device to be rewritten with the rewriting data based on the rewriting data using the second communication line and in parallel with the first communication line being used for the communication necessary for the normal processing.

2. The data rewriting method according to claim 1, wherein the rewriting device, prior to the rewriting step, determines whether data can be rewritten during running of the automobile based on an attribute of the control device to be rewritten, and if data cannot be rewritten during running of the automobile, further determines whether the automobile is running and avoids executing the rewriting step when the automobile is running.

3. A data rewriting method of rewriting data stored in a slave device of a control system while performing normal processing, the control system including a plurality of control devices in which data have been stored, each of which is a device for controlling an electric component of an automobile, a first communication line interconnecting the plurality of control devices, a second communication line interconnecting the plurality of control devices for backing up the first communication line, a third communication line, and a plurality of slave devices in which data have been stored, connected to any of the control devices via the third communication line, communication of which is controlled by the any of the control devices, wherein the first communication line is used for communication necessary for normal processing such as control of the electric component of the automobile, the second communication line is used for communication for data rewriting, and for normal processing when an abnormality occurs in the first communication line, the method comprising the steps of:

a connection step of connecting a rewriting device in which rewriting data have been stored to the second communication line; and a rewriting step via the rewriting device of rewriting data stored in the slave device to be rewritten with the rewriting data using the second and third communication lines and in parallel with the first communication line being used for the communication necessary for the normal processing.

4. A data rewriting system of rewriting data stored in a slave device of a control system while performing normal processing, in which a first communication line is used for communication necessary for normal processing such as control of an electric component of an automobile, a second communication line is used for communication for data rewriting, and for normal processing when an abnormality occurs in the first communication line, the data rewriting system, comprising:

a plurality of control devices in which data have been stored, each of which is a device for controlling the electric component of the automobile;

the first communication line interconnecting the plurality of control devices;

the second communication line interconnecting the plurality of control devices for backing up the first communication line;

a rewriting device in which rewriting data have been stored, wherein the rewriting device is configured to be connected to the second communication line by wire or wirelessly, and rewrite data stored in the control device to be rewritten with the rewriting data based on the rewriting data using the second communication line and in parallel with the first communication line being used for the communication necessary for the normal processing.

5. The data rewriting method according to claim 1, wherein the first communication line is used only for the communication necessary for the normal processing.

\* \* \* \* \*